(12) United States Patent
Montevirgen et al.

(10) Patent No.: US 9,400,528 B2
(45) Date of Patent: Jul. 26, 2016

(54) COVER GLASS ASSEMBLY REMOVAL

(71) Applicant: Apple Inc., Cupertino, CA (US)

(72) Inventors: Anthony S. Montevirgen, Milpitas, CA (US); Daniel W. Jarvis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 14/500,930

(22) Filed: Sep. 29, 2014

(65) Prior Publication Data

US 2016/0091931 A1    Mar. 31, 2016

Related U.S. Application Data

(63) Continuation of application No. PCT/US2014/058096, filed on Sep. 29, 2014.

(51) Int. Cl.
*H05K 7/00* (2006.01)
*G11B 33/02* (2006.01)
*G06F 1/16* (2006.01)
*A45C 11/00* (2006.01)

(52) U.S. Cl.
CPC .............. *G06F 1/1656* (2013.01); *A45C 11/00* (2013.01); *A45C 2011/002* (2013.01)

(58) Field of Classification Search
CPC .................................. E05B 77/02; E05B 85/02
USPC ......................................... 361/679.01–679.07
See application file for complete search history.

(56) References Cited

U.S. PATENT DOCUMENTS

| 2003/0020285 A1* | 1/2003 | Kluting | E05B 77/02 292/216 |
| 2006/0006667 A1* | 1/2006 | Hidding | E05B 85/02 292/216 |
| 2006/0175840 A1* | 8/2006 | Wang | H04M 1/0262 292/228 |
| 2011/0031985 A1 | 2/2011 | Johnson | |
| 2014/0069712 A1 | 3/2014 | Montevirgen et al. | |
| 2014/0069713 A1 | 3/2014 | Golko et al. | |
| 2014/0069714 A1 | 3/2014 | Uttermann et al. | |
| 2014/0069794 A1 | 3/2014 | Lin et al. | |

OTHER PUBLICATIONS

PCT Application No. PCT/US2014/058096—International Search Report and Written Opinion dated Jun. 29, 2015.
International Search Report and Written Opinion mailed Jun. 29, 2015, for PCT Application No. PCT/US2014/058096.

* cited by examiner

*Primary Examiner* — Jerry Wu
(74) *Attorney, Agent, or Firm* — Downey Brand LLP

(57) ABSTRACT

An internal fastening feature that also acts as a means of separating a housing body from a protective cover is disclosed. The internal fastening feature includes two arms that meet at a central hub that is pivotally coupled to a bracket. The bracket is coupled to an interior-facing surface of the protective cover. A first arm defines a threaded opening that receives a fastener that keeps the protective cover coupled with the housing body. A second arm, extending in a different direction than the first arm, is positioned above a protrusion of the housing body. When the fastener is disengaged from the first arm, a disengaging tool can apply a force to the first arm that rotates the second arm until it presses against the protrusion. The force applied to the protrusion is then transmitted to the protective cover, which is consequently pushed away from the housing body.

19 Claims, 6 Drawing Sheets

COVER GLASS ASSEMBLY REMOVAL

CROSS REFERENCE TO RELATED APPLICATIONS

This application is a continuation of International Application No. PCT/US14/58096 with an international filing date of Sep. 29, 2014, entitled "COVER GLASS ASSEMBLY REMOVAL," which is incorporated herein by reference in its entirety for all purposes.

FIELD

The described embodiments relate generally to methods and apparatus for removing a protective layer from a portable computing device. More particularly, the present embodiments describe a rotating fastening feature that facilitates removal of the protective layer from a housing body of the portable computing device.

BACKGROUND

To integrate numerous components within a small form factor electronic device, individual components of the electronic device are often arranged in close proximity with respect to one another to maximize space available within the device. Adhesively joining housing components together is one way in which to save space in housing designs in which space is at a premium, as space normally occupied by fasteners and fastening features is freed up. Adhesive joints can also be effective at preventing dust and/or moisture ingress between the housing components. Unfortunately, when one of the housing components includes a laminated structure, exertion of a removal force upon the laminated structure to overcome an adhesive bond joining the housing components can result in damage occurring to the laminated structure in the form of delamination. When the laminated structure includes high cost components along the lines of a display panel, this type of damage can incur significant costs to rework or replace the damaged components. Furthermore, at least a portion of a component damaged in this way can remain adhered to one of the housing components, which can require time-consuming clean up before the housing component can be reused.

SUMMARY

This paper describes various embodiments that relate to methods and apparatus for separating two adhesively joined housing components.

An electronic device is disclosed. The electronic device includes at least the following elements: a first housing component; a second housing component defining a fastener opening and cooperating with the first housing component to define an interior volume; a fastening feature extending from an interior facing surface of the first housing component and into the interior volume, the fastening feature defining a threaded opening that is engaged by a distal end of a fastener extending through the fastener opening. When the fastener is disengaged from the fastening feature the fastening feature is configured to transmit a force received from a disengaging tool. The disengaging tool transmits the force by extending through the fastener opening. The force is transmitted to the interior facing surface of the first housing component, which biases the first housing component away from the second housing component.

Another electronic device is disclosed. The electronic device includes at least the following: a housing body that includes a number of integrally formed sidewalls that cooperate with a bottom wall to define an interior volume, the housing body also including a protrusion extending into the interior volume from a select one of the sidewalls; a protective cover; and a fastening feature that removably couples the protective cover to the housing body, the fastening feature including: a bracket extending from an interior facing surface of the protective cover, and a number of arms extending from a central hub and pivotally coupled to the bracket, the number of arms including a first arm extending from the central hub in a first direction and defining a threaded opening, and a second arm extending from the central hub in a second direction different from the first direction, a distal end of the second arm proximate to the protrusion of the housing body; and a fastener extending through an opening in the housing body and engaged within the threaded opening defined by the first arm.

A protective cover suitable for closing an opening defined by a housing body of a portable electronic device is disclosed. The protective cover includes at least the following elements: a transparent substrate; a display assembly coupled to a central portion of an interior facing surface of the transparent substrate; a polymeric frame member coupled to a peripheral portion of the interior facing surface of the transparent substrate; and a fastening feature. The fastening feature includes at least the following: a bracket insert coupled to the polymeric frame member, and a number of arms extending from a central hub that is pivotally coupled to the bracket by a pin that engages a number of openings defined by the bracket, the arms including a first arm that extends away from the transparent substrate when a threaded opening defined by the first arm is engaged by a fastener that couples the protective cover to the housing body, and a second arm extending substantially parallel to the interior facing surface of the transparent substrate when the threaded opening is engaged by the fastener.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
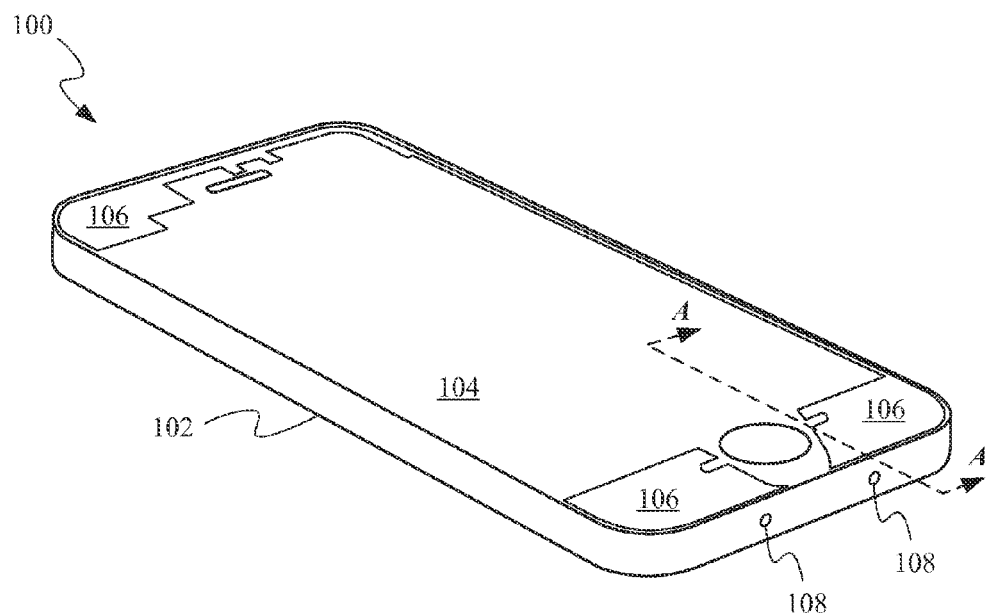
FIG. 1A shows a perspective view of an electronic device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

When portable electronic devices are formed of housing components having particularly tight tolerances, separating the housing components can require a substantial amount of force, due at least in part to frictional forces generated by relative motion of the housing components with respect to one another. In some embodiments, adhesive couplings between the housing components can further increase an amount of force necessary to separate the housing components. When removing the housing components a separation force generally tends to put the housing components in tension. One way to avoid placing tension on the housing components is to apply a force to an interior surface of one of the housing components, which is generally impractical when the housing components are engaged to form a device housing. When one of the housing components is a laminated structure, the tension force gets transmitted through each layer of the laminated structure. The tension can then result in any one of a number of the laminated layers becoming separated prior to the housing components separating. In some cases, internal layers can become partially separated, thereby reducing an effectiveness of the housing component having the laminated structure. For this reason, a way to exert a force upon an interior surface of at least one of the housing components is highly desirable.

One solution to this problem is to place a rotating release mechanism within the portable electronic device. In some embodiments, the rotating release mechanism can serve multiple purposes. For example, the rotating release mechanism can function as both a fastening mechanism that receives a fastener in an assembled state and as a release mechanism when the fastener is disengaged from the fastening mechanism. In one specific embodiment, the fastening mechanism can include two arms extending from a pivot point that is coupled with a laminated structure. A first arm can include a threaded opening for receiving a screw and a second arm can be configured to interact with a feature of another housing component to release the laminated structure from the other housing component.

These and other embodiments are discussed below with reference to FIGS. 1A-5; however, those skilled in the art will readily appreciate that the detailed description given herein with respect to these figures is for explanatory purposes only and should not be construed as limiting.

FIG. 1A shows a perspective view of an electronic device suitable for use with the described embodiments. Electronic device 100 includes a device housing formed from a number of housing components that cooperate to enclose a number of electrical components. In particular, the housing components include housing body 102 and protective cover 104. Housing body 102 can be formed from a rigid material and includes both integrally formed sidewalls and a bottom wall that help to surround internal electrical components that provide various functionality for electronic device 100. It should be noted that the internal electrical components have been omitted from the drawings to focus upon features of the housing components. For example, a display assembly or display panel can be adhered to a central portion of an interior facing surface of protective cover 104. Protective cover 104 can be a robust transparent substrate, sometimes referred to as cover glass, formed from a layer of transparent material along the lines of reinforced glass, plastic or sapphire. Protective cover 104 can be secured to housing body 102 by way of frame member 106 when frame member 106 is engaged by a number of fasteners 108. While frame member 106 is depicted in FIG. 1A it should be understood that frame member 106 is coupled with the interior-facing surface of protective cover 104. Frame member 106 can be adhesively coupled or laminated to the interior-facing surface of protective cover 104. In some embodiments, frame member 106 can be formed from plastic.

Figure 1B:
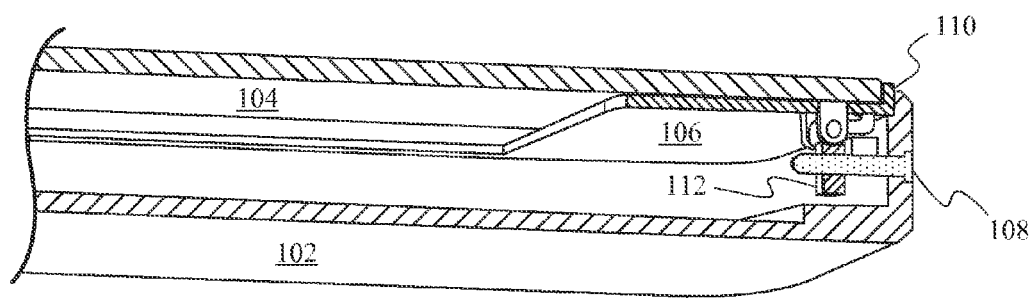
FIG. 1B shows a partial cross-sectional view of the electronic device depicted in FIG. 1A in accordance with section line A-A.

FIG. 1B shows a partial cross-sectional view of electronic device 100 in accordance with section line A-A. FIG. 1B shows how frame member 106 can also include lip portion 110 that by an interference fit can be operable as a seal between protective cover 104 and housing body 102 to at least help to prevent ingress of various contaminants into electronic device 100. In some embodiments, adhesive can be applied to an interface between lip portion 110 and housing body 102 to further prevent contaminant ingress. Frame member 106 can include a number of fastening features that can be embedded within the plastic that forms frame member 106. For example, fastening features can be insert-molded within frame member 106 prior to attachment of frame member 106 to protective cover 104. Each of the fastening features can include two arms that are pinned to a bracket that is insert-molded within frame member 106. In particular, first arm 112 extends from the bracket and defines a threaded opening for receiving one of fasteners 108. As depicted, fasteners 108 engage a threaded opening defined by first arm 112 through an opening defined by a sidewall of housing body 102, thereby coupling protective cover 104 with housing body 102. In some embodiments, an opposite side of protective cover 104 can also include similar attachment features. In other embodiments, an opposite end of protective cover 104 can include protrusions that engage an undercut feature of housing body 102. The engagement between the undercut feature and the protrusions prevents the opposite side of protective cover 104 from becoming dislodged from housing body 102.

Figure 1C:
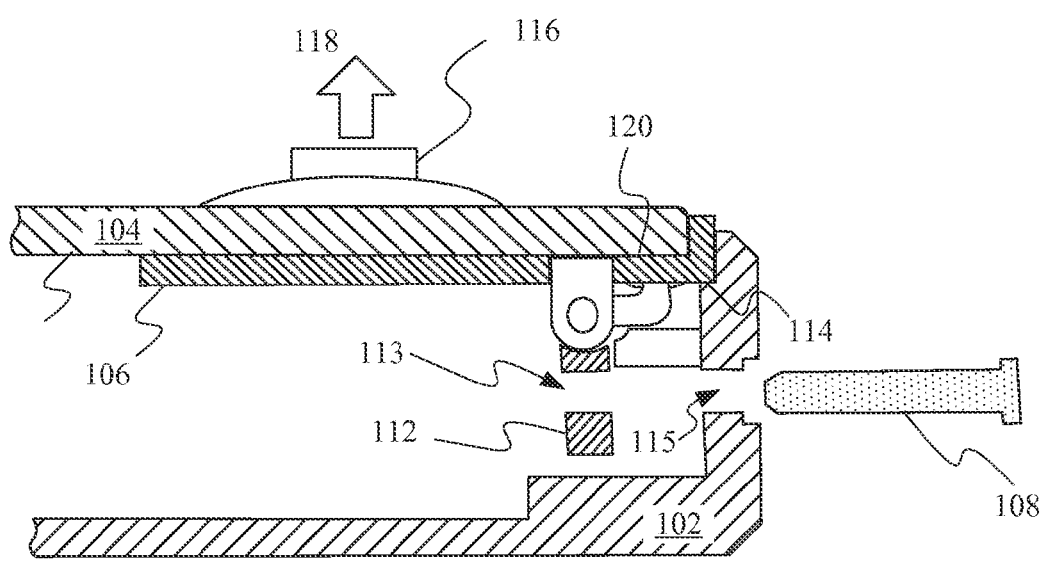
FIG. 1C shows a close up view of an interface between a frame member and a housing body of the electronic device.

FIG. 1C shows a close up view of an interface between frame member 106 and housing body 102. In this depiction, fastener 108 is shown disengaged from threaded opening 113 defined by first arm 112. If both fasteners 108 are disengaged from threaded openings 113, protective cover 104 is left attached to housing body 102 only at interface 114. In some embodiments, fasteners 108 can be completely removed from both threaded openings 113 and fastener openings 115. In some embodiments, frame member 106 of protective cover 104 is secured to housing body at interface 114 only by a friction fit. In other embodiments, frame member 106 is adhesively coupled to housing body at interface 114. To remove protective cover 104 a suction cup 116 can be applied to protective cover 104 to pull protective away 104 from housing body 102 in direction 118. Unfortunately, because frame member 106 is also adhesively coupled or laminated to protective cover 104 at interface 120, when the force is applied by suction cup 116 both adhesive bonds undergo stress. While the adhesive bond between protective cover 104 and frame member 106 can be designed to be stronger than the bond between frame member 106 and housing body 102, undergoing this type of removal operation can adversely affect the adhesive bond between protective cover 104 and frame member 106. For example, the adhesive bond at interface 120 can become delaminated in certain weak segments. These delaminated portions can weaken the bond and in some cases even become cosmetically apparent. These problems can be exacerbated when protective cover 104 is removed and replaced multiple times. Furthermore, an amount of friction between frame member 106 and housing body 102 can create uncertainty in an amount of force needed to remove protective cover 104 from housing body 102. For example, temperature extremes can cause increased binding between the components that could cause the adhesive bond at interface 120 to fail before the adhesive bond at interface 120.

Figure 2A:
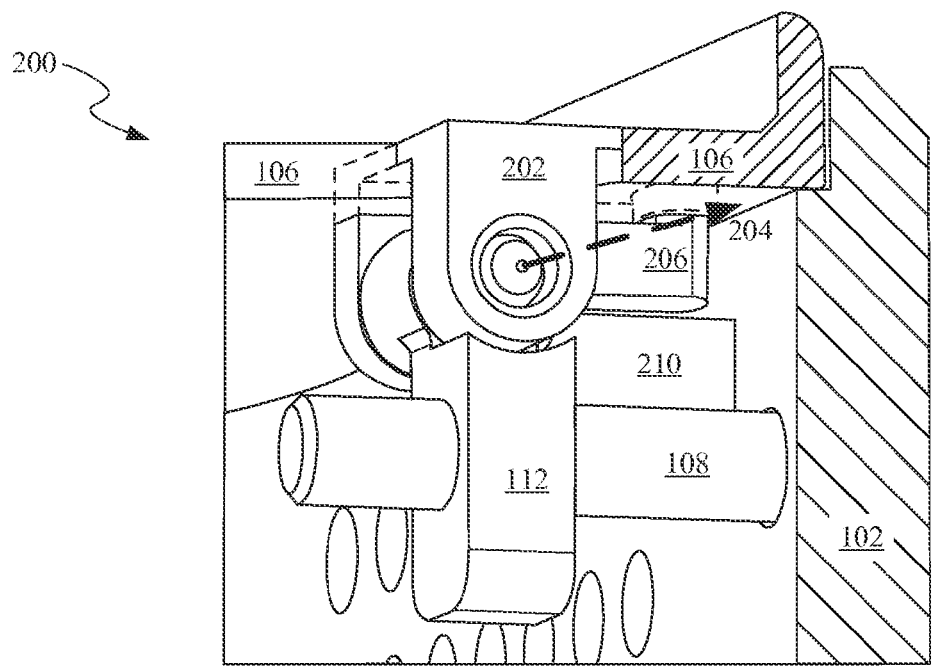
FIGS. 2A-2B show close up interior perspective views of a fastening feature in a fastened state and an unfastened state.

FIG. 2A shows a close up view of fastening feature 200 in a fastened state. Fastener 108 is shown engaging the opening in first arm 112. FIG. 2A also shows how first arm 112 can be pivotally coupled with bracket 202. By embedding at least a portion of bracket 202 within frame member 106, bracket 202 can be held in place, leaving first arm 112 free to rotate about axis 204 defined by an opening in bracket 202; however, when fastener 108 engages the opening defined by first arm 112, first arm 112 becomes locked in place. In this way fastener 108 secures protective cover 104 (not depicted) to housing body 102 by way of fastening feature 200. Fastening feature 200 can also provide structural support for protective cover 104 because both bracket 202 and second arm 206 are positioned beneath and in contact with frame member 106. In this way fastening feature 200 can act against pressure exerted against the surface of the protective cover or against a force biasing the protective cover away from housing body 102. Second arm 206 can be joined to or integrally formed with first arm 112. In some embodiments, first arm 112 and second arm 206 can be molded as a single piece. For this reason, rotation of second arm 206 causes rotation of first arm 112 and likewise rotation of first arm 112 causes rotation of second arm 206. In this way an angle between first arm 112 and second arm 206 can stay about the same. It should be noted that first arm 112 and second arm 206 join at a central region from which a pin extends and engages openings in bracket 202. The pinned engagement of the central region to bracket 202 allows first arm 112 and second arm 206 to be pivotally coupled with bracket 202.

Figure 2B:
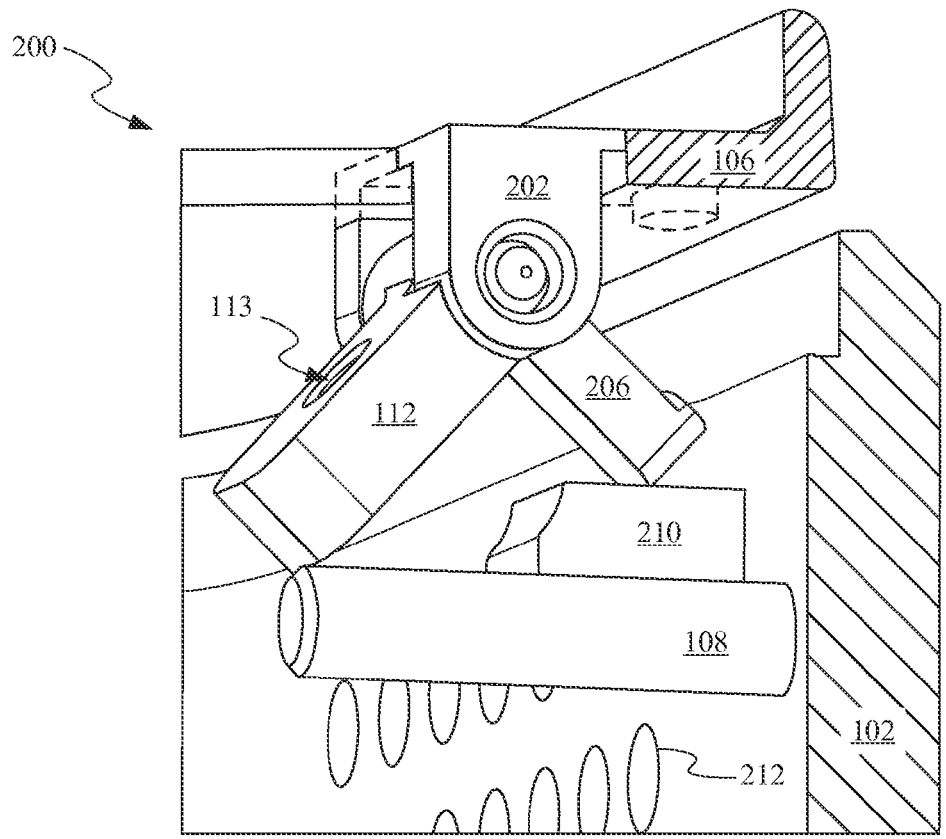

FIG. 2B shows a close up view of fastening feature 200 in an unfastened state. The unfastened state can be achieved from the fastened state in two steps. In the first step, fastener 108 is completely disengaged from first arm 112. When fastener 108 is a screw engaged in a threaded opening of first arm 112, fastener 108 can be disengaged by rotating fastener 108 in a counter-clockwise direction until it moves out of threaded opening 113. In the second step, fastener 108 is pushed directly back in against first arm 112 without rotation so that a moment is applied about axis 204 that causes second arm 206 to contact protrusion 210 of housing body 102. In some embodiments, protrusion 210 can be integrally formed with an interior surface of a wall of housing body 102. In some embodiments, protrusion 210 can be formed by a subtractive machining operation. Once the moment is exerted about axis 204, and second arm 206 contacts protrusion 210 frame member 106 is pushed upward and away from housing body 102. In this way, tension forces need not be placed upon protective cover 104 and any risk of delamination can be averted. Housing body 102 also defines numerous other openings including speaker openings 212. In some embodiments, first arm 112 can be an elongated arm that allows a greater mechanical advantage to be applied to first arm 112 by utilizing a disengaging tool through an opening along the lines of speaker openings 212 positioned lower within housing body 102. In such an embodiment, the disengaging tool may need to have an extended length to push first arm 112 through a range of motion equivalent to the range of motion achieved by engaging first arm 112 through the fastener opening through which fastener 108 is positioned.

Figure 3A:
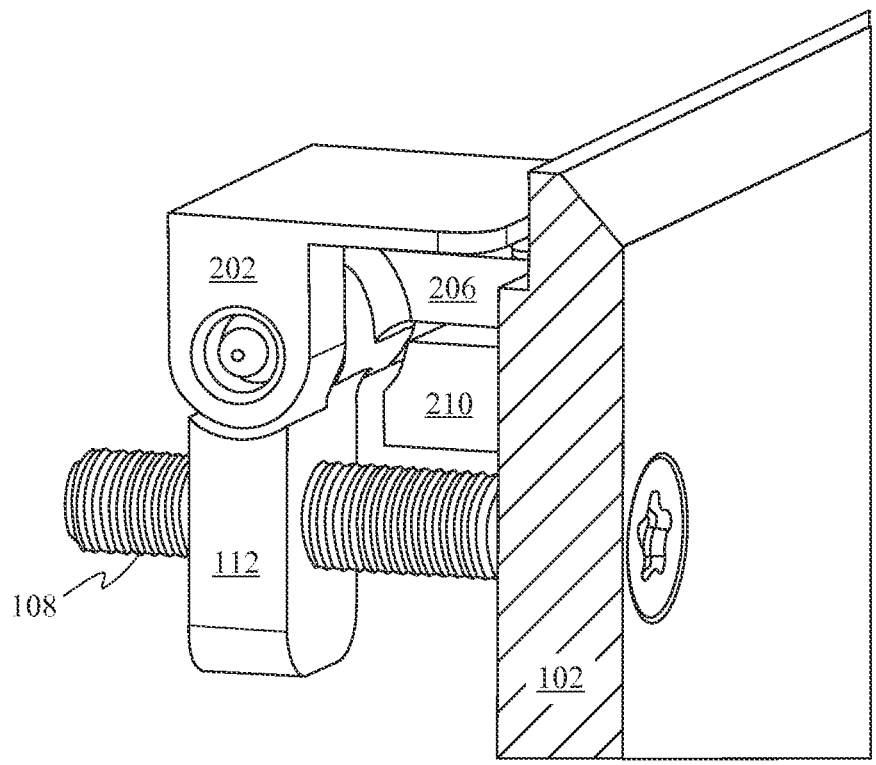
FIGS. 3A-3B show close up exterior perspective views of a fastening feature in a fastened state and an unfastened state.
Figure 3B:
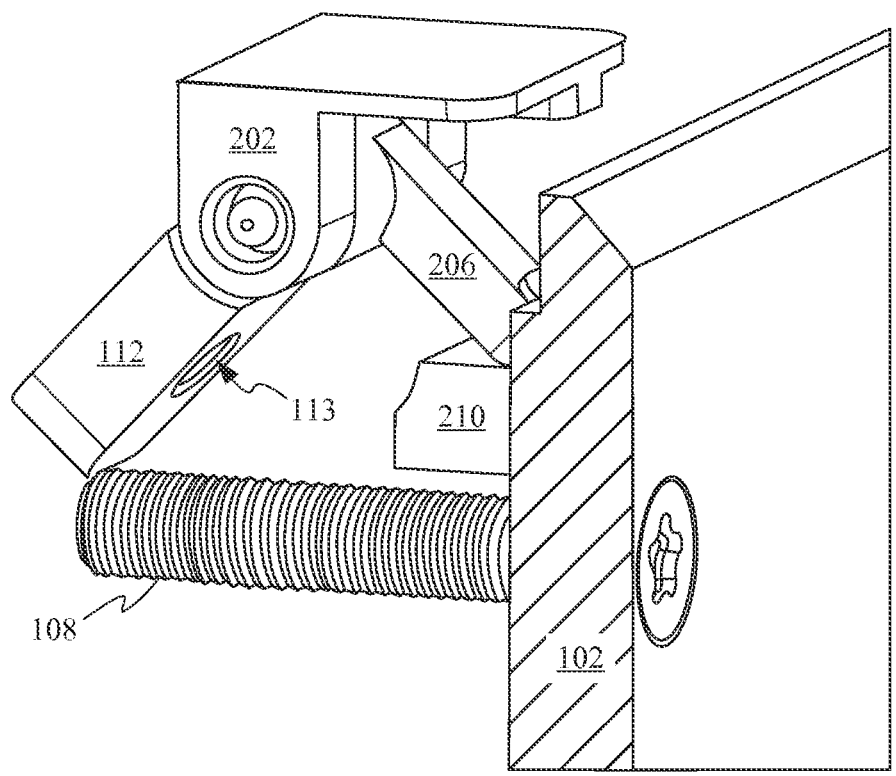

FIG. 3A shows another perspective view of fastening feature 200 from an exterior portion of electronic device 100. It should be noted that protective cover 104 and frame member 106 are excluded from this depiction for clarity purposes. Fastener 108 is shown as a threaded fastener engaging first arm 112. This orientation of fastening feature 200 depicts how a curved cutout region of protrusion 210 allows a central region of a rotating portion of the fastening feature to be positioned next to or even to rest upon protrusion 210 without being constrained by protrusion 210. FIG. 3B shows fastening feature 200 disengaging protective cover 104 (not shown) from housing body 102. FIG. 3B also shows how a maximum height of fastening feature 200 is achieved when a bottom corner of first arm 112 contacts a top surface of fastener 108. FIG. 3B also shows how first arm 112 defines the threaded opening that mates with fastener 108. It should be noted that first arm 112 is offset from second arm 206, thereby causing first arm 112 and second arm 206 to rotate in different, substantially parallel planes. This offset allows fastener 108 to engage first arm 112 without having to pass beneath or risk close contact with protrusion 210. Furthermore, this offset arrangement also allows second arm 206 to contact a central portion of protrusion 210.

Figure 4A:
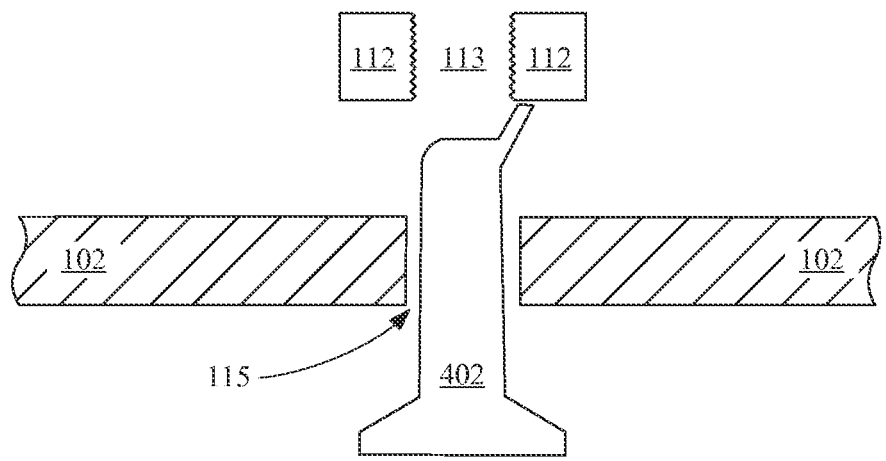
FIGS. 4A-4B show cross-sectional views of various disengaging tools engaging a first arm of the fastening feature.

FIG. 4A shows a top view of a portion of a bottom end of electronic device 100. In some embodiments, disengaging tool 402 can be utilized to separate the protective cover from housing body 102. Disengaging tool 402 can have a similar shape to fastener 108 so that it can fit through the opening in housing body 102 that is configured to accommodate fastener 108. Disengaging tool can include an off-center protrusion configured to engage first arm 112 on one side of threaded opening 113. By shaping disengaging 402 in this way, a likelihood of disengaging tool 402 being stuck in or scratching up threading that defines threaded opening 113 can be substantially reduced.

Figure 4B:
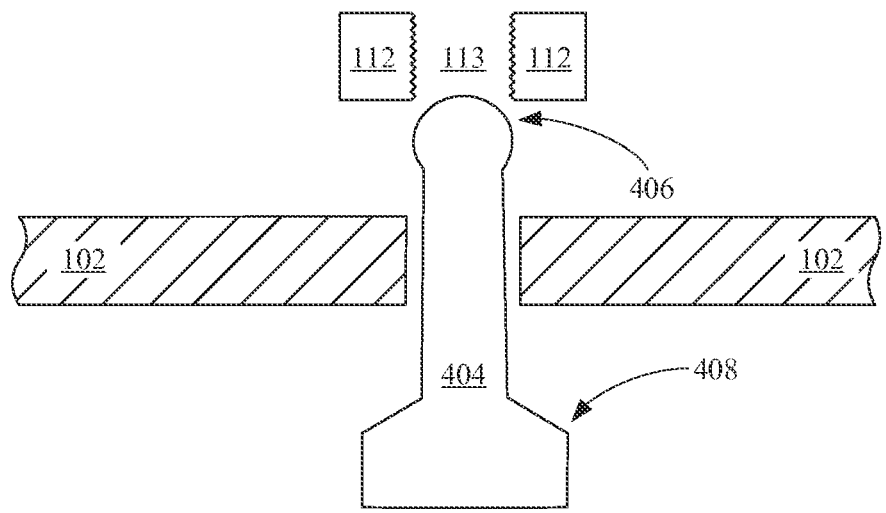

FIG. 4B shows another configuration that can be utilized to separate the protective cover from housing body 102. Disengaging tool 404 can be formed of a softer material than fastener 108 and first arm 112. For example, disengaging tool 404 can be formed from hard plastic or from any material softer than first arm 112. In this way, a likelihood of damaging first arm 112 when applying a force to first arm 112 with disengaging tool 404 is substantially reduced. In some embodiments, disengaging tool 404 can include rounded head 406 sized larger than threaded opening 113. The rounded head can reduce a likelihood of the disengaging tool 404 becoming trapped or otherwise engaged within threaded opening 113 as it doesn't include any ridges or protrusions which could become engaged within one of the threads defining threaded opening 113. Furthermore, as first arm 112 rotates away from housing body 102, first arm 112 can smoothly slide along the curved surface defined by rounded head 406. Disengaging tool 404 can also include a shaped grip 408 having a flat geometry and a size greater than a finger width that enables a user or technician to firmly grip disengaging tool 404. Such a grip can be advantageous when an adhesive coupling between frame member 106 and housing body 102 is particularly strong. It should be noted that in some embodiments, a tool can be utilized that includes two or more protrusions for simultaneously actuating each of a number of fastening features concurrently. The protrusions can have a size about the same as that of fasteners 108. By actuating the fastening features concurrently a symmetric force can be applied over a larger area, thereby increasing an ease with which protective cover 104 can be removed.

Figure 5:
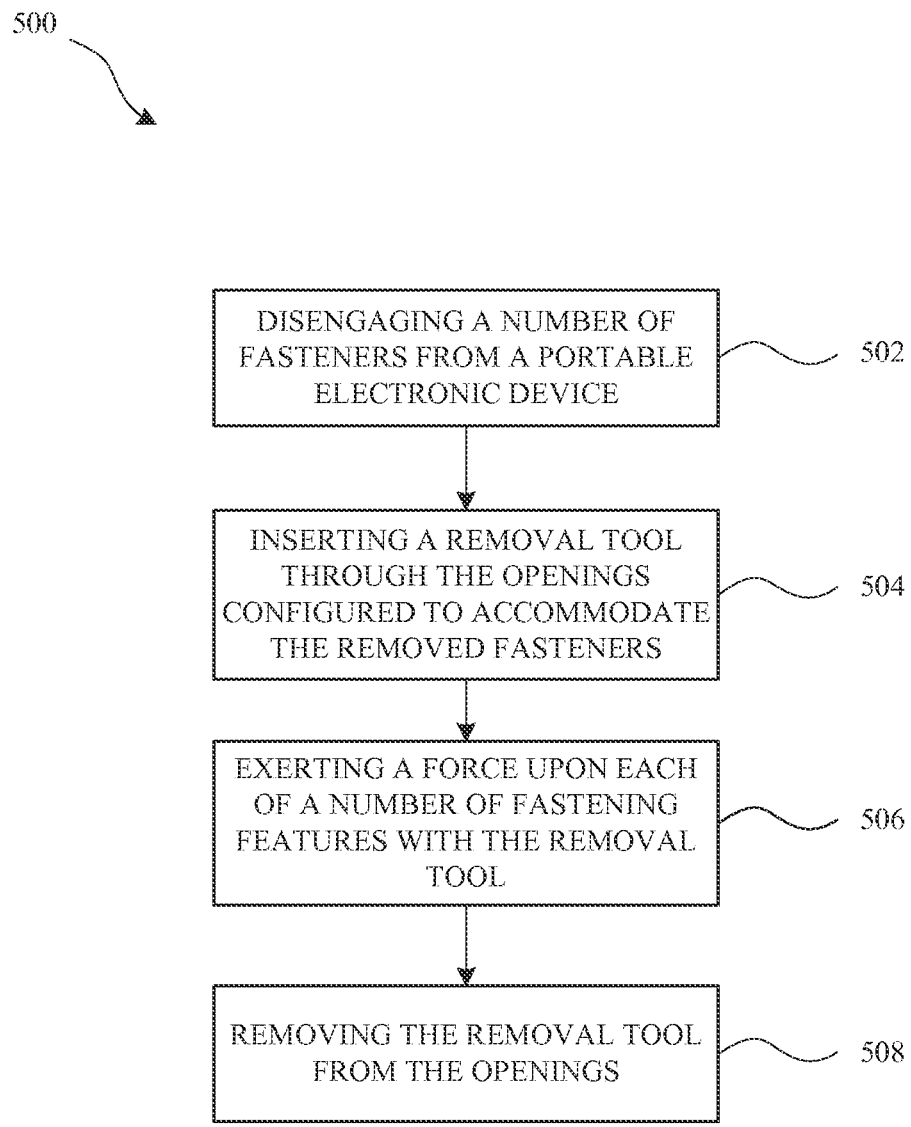
FIG. 5 shows a flow chart representing a method for separating a protective layer from a housing body of a portable electronic device.

FIG. 5 shows a flow chart representing a method 500 for separating a protective layer from a housing body of a portable electronic device. In a first step 502 each of a number of fasteners are removed from one end of the electronic device. In a second step 504 a protective cover removal tool is inserted back through the openings through which the removed fasteners extended. In some embodiments, the removed fasteners can be reinserted through the openings. In other embodiments a customized removal tool or tools can be utilized. For example, the customized tools can be formed of a softer material than the removed fasteners to minimize risk of damage to fastening features disposed within the portable electronic device. At step 506 a force is applied to each of a number of fastening features with the removal tool or tools. The force applied to the fastening features should be increased until a seal between a protective cover and a housing body of the portable electronic device is broken, at which point the fastening features allow the removal tool to travel into the electronic device until the fastening features rotate and lift the protective cover high enough to pull the protective cover away from the housing body. At step 508, the removal tool or tools can be removed subsequent to the protective cover being removed from the housing body.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising:
   a first housing component;
   a second housing component defining a fastener opening and cooperating with the first housing component to define an interior volume; and
   a fastening feature extending from an interior facing surface of the first housing component and into the interior volume, the fastening feature defining a threaded opening that is engaged by a distal end of a fastener extending through the fastener opening,
   wherein when the fastener is disengaged from the fastening feature the fastening feature is configured to transmit a force received from a disengaging tool extending through the fastener opening to the interior facing surface of the first housing component that biases the first housing component away from the second housing component and wherein the fastening feature comprises:
   a plurality of arms extending from a central hub; and
   a bracket extending from the interior facing surface and pivotally coupled to the central hub by a pin extending through a plurality of openings defined by the bracket.

2. The electronic device as recited in claim 1, wherein the disengaging tool is the fastener.

3. The electronic device as recited in claim 1, wherein the first housing component is adhesively coupled to the second housing component.

4. The electronic device as recited in claim 3, wherein the biasing provided by the fastening feature upon the first housing component in response to the transmitted force overcomes the adhesive coupling between the first and second housing components.

5. The electronic device as recited in claim 1, wherein the first housing component is a laminated structure comprising a transparent substrate covering an opening defined by a plurality of walls of the second housing component.

6. The electronic device as recited in claim 5, wherein the laminated structure further comprises a polymeric frame member adhesively coupled to at least a portion of one surface of the transparent substrate.

7. The electronic device as recited in claim 6, wherein a portion of the fastening feature is insert-molded into the polymeric frame member.

8. An electronic device, comprising:
   a housing body, comprising a plurality of integrally formed sidewalls that cooperate with a bottom wall to define an interior volume, the housing body comprising a protrusion extending into the interior volume from a select one of the plurality of sidewalls;
   a protective cover; and
   a fastening feature comprising:
   a bracket extending from an interior facing surface of the protective cover, and
   a plurality of arms extending from a central hub and pivotally coupled to the bracket, the plurality of arms comprising:
   a first arm extending from the central hub in a first direction and defining a threaded opening, and
   a second arm extending from the central hub in a second direction different from the first direction, a distal end of the second arm proximate to the protrusion of the housing body; and
   a fastener extending through a fastener opening in the housing body and engaged within the threaded opening defined by the first arm that removably couples the protective cover to the housing body.

9. The electronic device as recited in claim 8, wherein the fastening feature is configured to disengage the protective cover from the housing body when the fastener is removed from the threaded opening and a first force is exerted against the first arm so that the second arm contacts the protrusion and exerts a second force against the interior-facing surface of the protective cover by way of the bracket.

10. The electronic device as recited in claim 9, wherein the first force is applied to the first arm with a disengaging tool extending through an opening in the housing body positioned below the fastener opening.

11. The electronic device as recited in claim 9, wherein the central hub is pivotally coupled to the bracket by way of a pin extending from the central hub and into at least one opening defined by the bracket.

12. The electronic device as recited in claim 11, wherein the bracket is insert-molded into a polymeric frame that is adhesively coupled to the interior-facing surface of the protective cover.

13. The electronic device as recited in claim 12, wherein the fastening feature severs the adhesive coupling between the polymeric frame and the protective cover without stressing the adhesive coupling between the protective cover and the polymeric frame in response to the first force being exerted against the first arm.

14. A protective cover suitable for closing an opening defined by a housing body of a portable electronic device, the protective cover comprising:
   a transparent substrate;
   a display assembly coupled to a central portion of an interior facing surface of the transparent substrate;
   a polymeric frame member coupled to a peripheral portion of the interior facing surface of the transparent substrate; and
   a fastening feature, comprising:
      a bracket coupled to the polymeric frame member, and
      a plurality of arms extending from a central hub that is pivotally coupled to the bracket by a pin that engages openings defined by the bracket, the plurality of arms comprising:
         a first arm that extends away from the transparent substrate when a threaded opening defined by the first arm is engaged by a fastener that couples the protective cover to the housing body, and
         a second arm extending substantially parallel to the interior facing surface of the transparent substrate when the threaded opening is engaged by the fastener.

15. The protective cover as recited in claim 14, wherein the first arm is offset from the second arm so that the first arm rotates in a different plane than the second arm.

16. The protective cover as recited in claim 14, wherein the bracket is insert-molded within the polymeric frame member.

17. The protective cover as recited in claim 14, wherein when the fastener is coupled within the threaded opening of the first arm the plurality of arms is prevented from pivoting with respect to the bracket.

18. The protective cover as recited in claim 14, wherein when the fastener is disengaged from the threaded opening the first arm is configured to receive a force that causes both the first and second arms to pivot, and wherein the second arm engages a protrusion extending from an interior surface of the housing body as it pivots.

19. The protective cover as recited in claim 18, wherein the engagement between the second arm and the protrusion of the housing body biases the protective cover away from the housing body.

\* \* \* \* \*